G. B. GARWOOD.
GATE.
APPLICATION FILED JAN. 16, 1908.
935,650.
Patented Oct. 5, 1909.
2 SHEETS—SHEET 2.
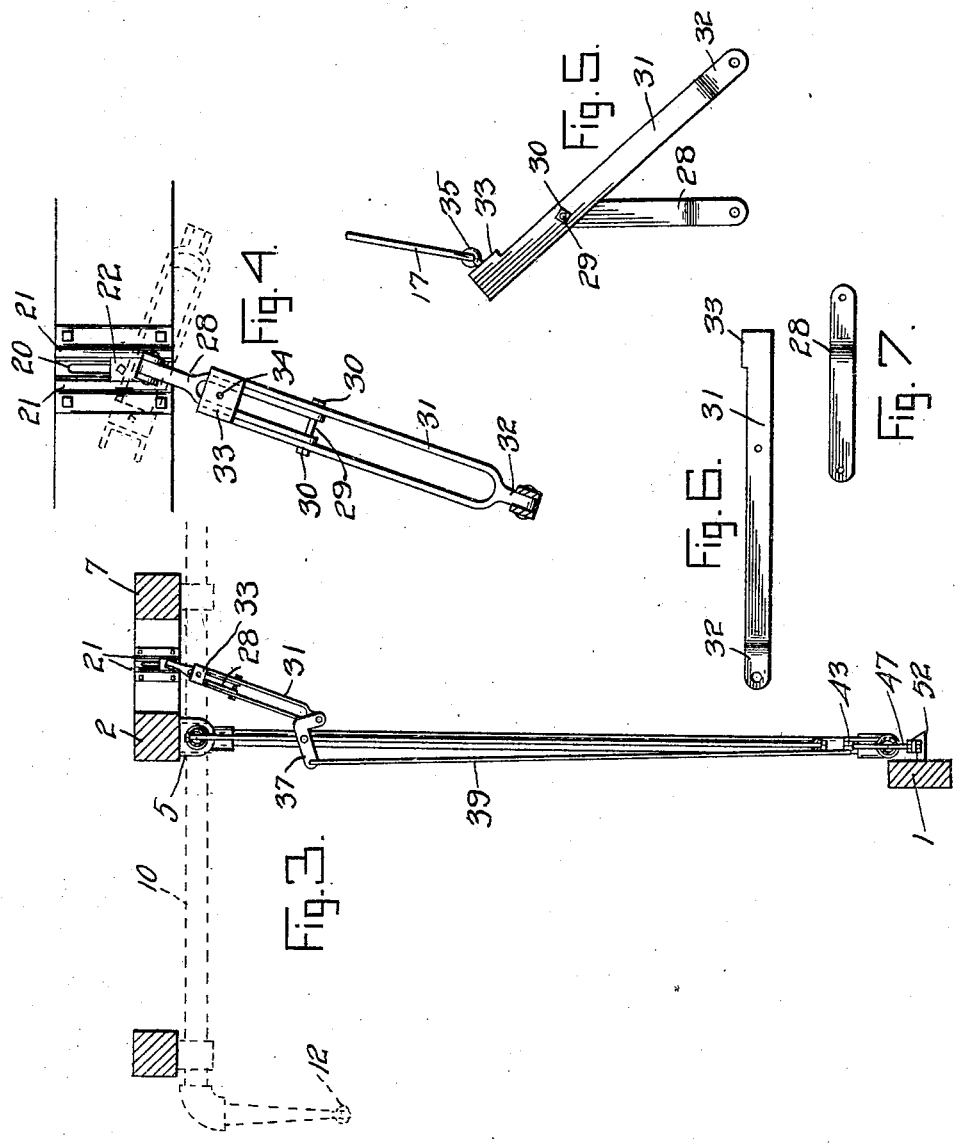
WITNESSES
INVENTOR:
George B. Garwood,
by
his attorney.

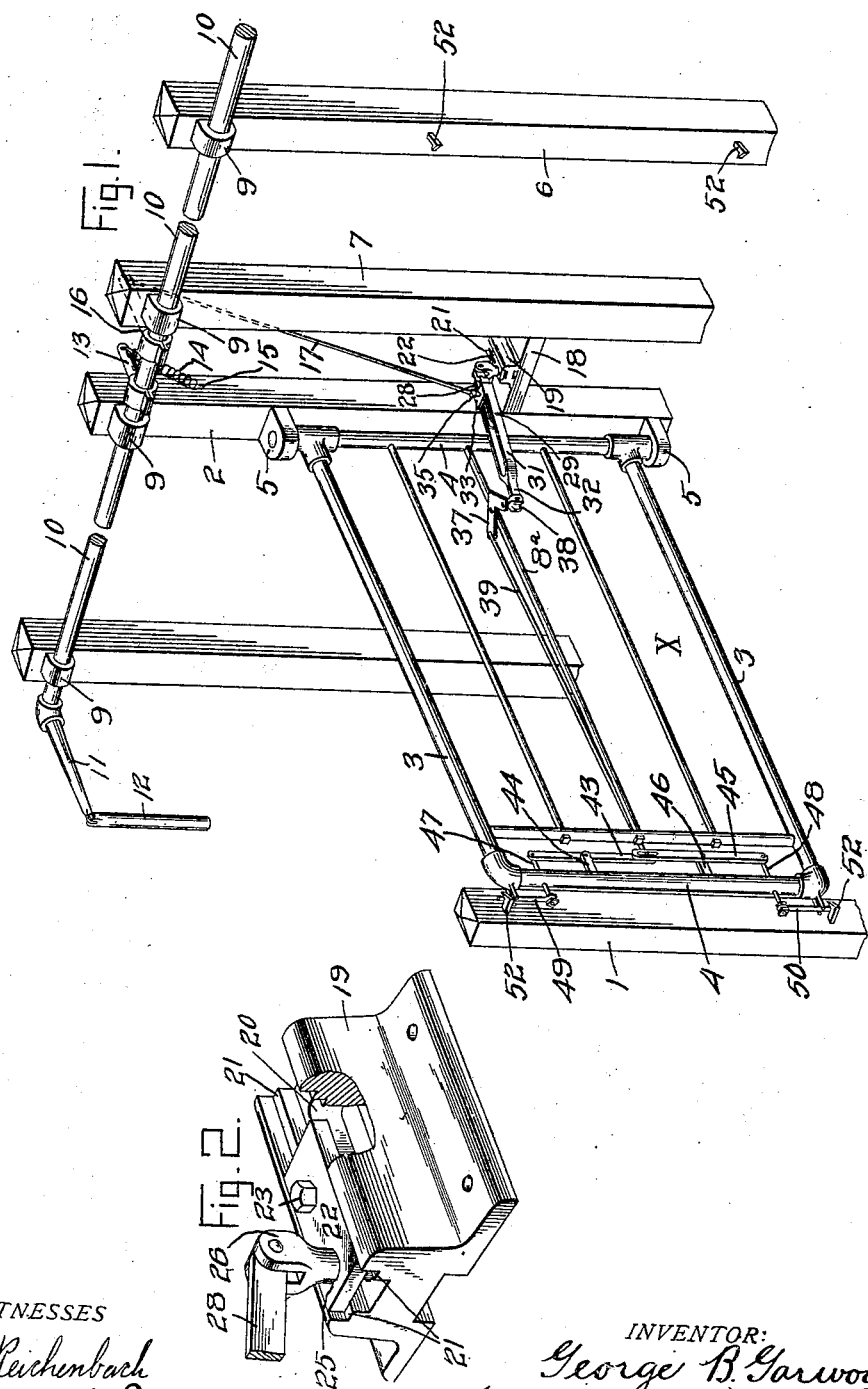

UNITED STATES PATENT OFFICE.

GEORGE BOONE GARWOOD, OF HOMER, ILLINOIS, ASSIGNOR TO GUS RADEBAUGH, OF URBANA, ILLINOIS.

GATE.

935,650.  Specification of Letters Patent.  Patented Oct. 5, 1909.

Application filed January 16, 1908. Serial No. 411,147.

*To all whom it may concern:*

Be it known that I, GEORGE BOONE GARWOOD, a citizen of the United States, residing at Homer, county of Champaign, and State of Illinois, have invented certain new and useful Improvements in Gates; and I do hereby declare the following to be a full, clear, and exact description of the invention, such as will enable others skilled in the art to which it appertains to make and use the same.

The object of my invention is to provide a form of gate, so constructed as to afford facile and convenient means of ingress and egress under the various requirements of those passing through it, its operating and locking-mechanism adapting it not only to the easy manipulation of those on foot, but, as well, from horseback or vehicles, obviating, thus, in the two latter instances, the necessity of dismounting in order to open or close the gate; the structure, also, being such that the gate will always remain closed or open as may be desired except when operated by said mechanism.

With these objects in view, the invention comprehends the novel combination, association, and arrangement of parts in gate-structure, as hereinafter fully described in the specification and illustrated in the drawings.

The dominating features of my invention are a rotatable member, operated and controlled by suitable mechanism, in combination with a novel form with (what I shall herein refer to as) "trip-mechanism", and of gate-locking mechanism.

In the accompanying drawings, forming part of this specification, and in which like character of reference indicate corresponding parts, I have illustrated one of many embodiments of my invention; and in these drawings: Figure 1 is a perspective view of a swinging-gate, with my invention attached, showing the gate closed and locked; Fig. 2 is a similar view of the slide-block and some of its adjunctive parts; Fig. 3 is a view in plan of the gate, with my improved structure applied thereto; Fig. 4 is a similar view enlarged, of a part of the gate-tripping device; Figs. 5, 6 and 7 are detail views of parts of the tripping device.

In these drawings: the numeral 1 indicates the common form of stop-post, in which the latch-engaging element (hereinafter to be described) is fixed.

2 indicates the hinge-post. The gate X, comprising, in this instance, the frame 3, 3, 4, 4, is supported on the post 2 by means of the hinges 5, 5, and swings from the stop-post 1 to the post 6. The gate may be made rigid by utilizing brace-rods (not shown), extending from diametrically-opposite corners, and by vertical connecting-rods (not shown).

Rotatably-supported (as in bearings 9), adjacent the upper ends of the posts 2, 6, and 7, is a rotatable member or shaft 10, which carries, at each end, an arm 11, to which is pivotally-attached a handle 12.

Rigidly attached to the shaft 10, and preferably between the adjacent posts 2 and 7, is a short arm 13, to the free end of which is attached a spring 14, connected, at its other end, to a pin 15 in the upper portion of the post 2, (Fig. 1). Adjacent the arm 13, and also rigidly secured to the shaft 10, is an arm 16, preferably of somewhat greater length than the arm 13. Pivoted to the free end of this arm 16 is a connecting-rod 17, which, in normal position preferably occupies a position between the adjacent posts 2 and 7.

Disposed between the adjacent posts 2 and 7, is a cross-piece 18, upon which is secured, in any desirable manner, plate 19, provided with an elongated slot 20, and, in its upper portion a guide-way 21, in which a slide-block 22 is designed to slide, a screw or bolt 23 extending through a hole or opening in said slide-block, and through said slot 20, which permits said block to be adjusted longitudinally of said plate 19.

Turning in a hole 25 at the opposite end of the slide-block 22, is an upstanding post or standard 26, through which, near its upper end, a short shaft or pintle extends and which carries binding-nuts (not shown) at its opposite ends. Pivoted at one end on this shift, is a bifurcated guiding-member 28. Pivoted at the opposite, bifurcated ends of this member 28 (as by a short shaft 29, extending through openings or perforations in said ends and carrying nuts 30, 30) is a trip-actuating-member 31 (Fig. 4) comprising two parallel arms curving together at one end and carrying, centrally thereof, a lug or projection 32; and, at the opposite end connected by a cross-plate 33, provided with a small hole 34, into which is threaded a screw-eye 35, with which engages the lower end of connecting rod 17, already referred to. It is to be observed that, when the bifurcated member 28 is in its lowermost positions, as shown in Figs. 1 and 4, the parallel arms of the trip-actuating-member 31 lie parallel with and alongside of the separated portions of the bifurcated member 28.

Pivotally mounted on rod $8^a$ is an L-shaped piece 37, from the forward member of which rotatably depends a forked swivel-joint member 38, (Fig. 1) to which the lug 32 on the trip-actuating-member is pivoted. To the rear member of said L-shaped piece is pivoted a connecting-rod 39. The said rod 39 has its opposite end bent to engage in a hole of a lever 43 pivoted, near its center, on a boss 44, carried by the outer upright bar 4 of the gate-frame. Connecting with said lever 43, at its lower end, and to form a knee-joint is a similar lever 45, pivoted, centrally, on a boss 46. Each of said levers 43 and 45 has projecting from its free end, a latching-member 47 and 48, respectively, which, in turn carry spring-elements 49, 50, respectively, designed to latch over headed pins 52, carried by the posts 1 and 6, and from which they are disengaged when the spring elements 49 and 50 are operated by the latching-members 47 and 48 that are moved by the actuation of the levers 43 and 45, which levers are operated by the connecting-rod 39 that is projected or withdrawn (as the case may be) by the turning of the L-shaped piece on its pivot during the movement of the trip-actuating-member 31.

The operation will be obvious: A person wishing to pass through the gate pulls down on the handle 12, and thereby rotates the shaft 10, the spring 14, by the upward movement of the arm 13, being thereby tensioned. At the same time, by the same rotation of the shaft 10 and the consequent upward movement of the arm 16, the connecting-rod 17 pulls the lower end of the trip-actuating-member 31 upward. At the same time, the fulcrum-point 29 of the bifurcated member 28 cuts an arc of a circle, and in its cycle of travel, its position is changed from that illustrated in Fig. 1 to a position partly back of plate 19. This movement of the lever 31 shifts the L-shaped plate which then moves the rod 39 which, in its turn, operates the lever-arms 43 and 45 to cause them, through the short arms 47 and 48, to operate the spring-elements 49 and 50 to effect their disengagement from the pins 52. The gate is, thus, unlocked, and the parts just described, (effecting the unlocking of the gate) constitute what I term my "trip-mechanism".

It is to be understood that, after the initial actuation of this trip-mechanism which effects the unlocking of the gate, such trip-mechanism has a continued movement until it reaches the limit of its actuated travel. During the first part thereof, after unlocking of the gate has been effected, the trip-mechanism, by the "overthrow" of the member 28 and actuating member 31, swings the gate half way toward the post 6, that is, after the said mechanism shall have passed beyond midway of its cycle of travel, the stress of the spring (operating to rotate the shaft toward its normal position) causes the arm 16 to lower, whereby the connecting-rod 17, and its connecting-parts swing the gate toward and against the post 6, at which time the trip-mechanism will (by the return of the shaft to its normal position, and by the connecting rod 17 and bifurcated member 28 and actuating member 31 reaching the limit of their travel in their shifted position) operate the gate-locking-mechanism (already described) and lock the gate to post 6. A pull on either of the handles 12 to rotate the shaft 10 and actuate the connecting parts will first unlock the gate from post 6, and swing the gate back to its "closed" position to lock it to post 1.

In order that the trip-actuating-mechanism may be adjusted, at its point of support on the cross-piece 18, I provide for such adjustment by making the block 22 slidable on its supporting-plate 19, the screw or bolt 23 being designed to hold the same when adjusted.

In Fig. 1, the parts are illustrated as in their normal, unshifted position: In this position, the bifurcated member appears as extending to the left of the cross-piece 18. The member 31, is likewise, disposed to the left of the same. Moreover, the connecting-rod 17 also occupies a position to the left of the same piece.

In Fig. 3, which is a view in plan, the relative positions of the parts appear as in their normal position, the same as in Fig. 1. But, in Fig. 4, the parts are illustrated as occupying an entirely different position, namely, their shifted position, and, thus, occupy a position, in part, to the right, or to the rear, of the piece 18. The member 28 appears as being to the rear of the piece 18. When the connecting-rod 17 is actuated by means of the arm 16, when the shaft 10 is rotated, the rear end of the member 31 is raised until the fulcrum-point 29 reaches its highest vertical position. During this movement, the gate-latching-mechanism has been actuated, the tension-device has been placed under stress, and the different parts have been properly positioned to perform their next succeeding operations, namely, to swing the gate entirely open, which occurs while the rear end of the member 31, the fulcrum-point 29, and the member 28 are assuming their position to the rear, which position is illustrated in Fig. 4 of the drawing.

Having thus described my invention, what I claim and desire to secure by Letters-Patent is:

1. In a gate-swinging and latching mechanism, the combination of a rotatable operating member, a bifurcated-trip-actuating-member, a bifurcated-guiding-member pivoted to and straddled by said trip-actuating member, a slidable element by which said guiding-member is supported and positioned, a shiftable member pivoted to said trip-actuating member, and connections between said rotatable member and said trip-actuating member.

2. In a gate-swinging and latching mechanism, the combination of a rotatable operating member, a bifurcated trip-actuating member, a guiding member pivoted to and straddled by said trip-actuating member, a horizontally shiftable element to which said guiding-member is pivoted and by which it is positioned, an L-shaped shiftable member pivoted to said trip-actuating member, and connections between said rotatable member and said trip-actuating member.

3. In a gate-swinging and latching mechanism, the combination of a rotatable operating member, a trip-actuating member, a guiding element pivoted to said member, a slidable element with which said guiding-member connects and by which it is positioned at one end, a latching device connected to and operated directly by and during the movement of said trip-actuating member, and connections between said rotatable member and said trip-actuating member.

4. In a gate-swinging and latching mechanism, the combination of a rotatable operating member, a trip-actuating member, a guiding element pivoted to said member, a latching device connected to and operated by said trip-actuating member, and a slidable block to which said guiding element is pivoted and with which its block-end moves in a horizontal plane.

5. In a gate-swinging and latching mechanism, the combination of a rotatable operating member, a trip-actuating member, a guiding member pivoted to and straddled by said trip-actuating member, a shiftable member pivoted to said trip-actuating member, and a slidable block to which said guiding member is pivoted.

6. In a gate-swinging and latching mechanism, the combination of a rotatable operating member, a trip-actuating member, a guiding element pivoted to said trip-actuating member, a shiftable member pivoted to said trip-actuating member, a latching device connected to and operated directly by said trip-actuating member, and a slidable block to which the guiding element is pivoted, and connections between the rotatable member and said trip-actuating member.

7. In a gate-swinging and latching mechanism, the combination of a rotatable operating member, a trip-actuating member, a guiding element pivoted to said trip-actuating member, a shiftable member pivoted to said trip-actuating member, a latching device connected to and operated directly by said trip-actuating member, a slidable block to which the guiding element is pivoted and connections between the rotatable member and said trip-actuating member, and a supporting plate in which said slidable block is shiftably mounted.

8. In a gate-swinging and latching mechanism, the combination of a rotatable operating member, a trip-actuating member, a guiding element pivoted to said trip-actuating member, a shiftable member pivoted to said trip-actuating member, a latching device connected to and operated directly by said trip-actuating member, a slidable block to which the guiding element is pivoted and connections between the rotatable member and said trip-actuating member, a supporting plate in which said slidable block is shiftably mounted, and a rotatable upstanding post supported in and slidable with said slidable block.

9. In a gate swinging and latching mechanism, the combination with a rotatable operating member, a tension-device operating to rotate said member in one direction, means for rotating said member in the opposite direction, a trip-actuating member connected to said rotatable operating member, a bifurcated member upon which said actuating member is pivoted adjacent one end, a pivotal support for said bifurcated member and adapted to permit the same to be turned and, also, tilted thereon, a shifting plate with which the trip-actuating member connects, a swivel-joint disposed between said shifting-plate and said actuating member, and a connecting member engaging, at its one end, with said trip-actuating member and, at its opposite end, with latch operating levers.

10. In a gate swinging and latching-mechanism, the combination with a rotatable operating member, a tension-device operating to rotate said member in one direction, means for rotating said member in the opposite direction, a trip-actuating member connected to said rotatable operating member, a bifurcated member upon which said trip-actuating-member is pivoted adjacent one end, a pivotal support for said bifurcated member and adapted to permit the same to be turned and, also, tilted thereon, a shifting plate with which the trip-actuating member connects, a swivel-joint disposed between said shifting plate and said actuating member, and a connecting-member engaging, at its one end, with said trip-actuating member and, at its opposite end, with latch-operating levers, and an adjusting device adapted to change the position of the pivotal-support for said bifurcated member and, incidentally, to change the relative positions of the operating parts connecting therewith.

11. In a gate-swinging and latching mechanism, the combination of a rotatable operating member, a bifurcated trip-actuating member, a bifurcated guiding member pivoted to said trip-actuating member, the bifurcated parts of the guiding member straddling the bifurcated parts of said trip-actuating member, a slidable supporting element with which said guiding-member is connected, a shifting plate pivoted to said trip-actuating member, and an operating rod connected to said shifting plate, a latching mechanism connected with and operated by said rod, said latching mechanism through said rod being operated by said trip-actuating member.

12. In a gate-swinging and latching mechanism, the combination of a rotatable operating member, a bifurcated trip-actuating member, a guiding member pivoted to and straddled by said trip-actuating member, a horizontally-slidable element with which said guiding-member is connected, a horizontally shifting member pivoted to said trip-actuating member, an actuating rod connected with said shifting plate, a latching device supported on and swinging with the gate and operable by and during operation of the gate swinging-mechanism and said trip-actuating member.

In testimony whereof I have hereunto set my hand and seal in the presence of two subscribing witnesses.

GEORGE BOONE GARWOOD. [L. S.]

Witnesses:
ALBERT EARL MILLER,
GUS. RADEBAUGH.